United States Patent
Lee et al.

(10) Patent No.: US 9,677,929 B2
(45) Date of Patent: Jun. 13, 2017

(54) METHOD AND APPARATUS FOR ADJUSTING AN APERTURE IN AN OPTICAL SYSTEM

(71) Applicant: SAMSUNG ELECTRONICS CO., LTD., Suwon-si (KR)

(72) Inventors: Eun-sung Lee, Hwaseong-si (KR);
Seung-wan Lee, Suwon-si (KR);
Jong-hyeon Chang, Suwon-si (KR);
Kyu-dong Jung, Suwon-si (KR);
Min-seog Choi, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 533 days.

(21) Appl. No.: 14/149,234

(22) Filed: Jan. 7, 2014

(65) Prior Publication Data
US 2014/0191107 A1    Jul. 10, 2014

(30) Foreign Application Priority Data

Jan. 7, 2013 (KR) .................. 10-2013-0001785

(51) Int. Cl.
*G01J 1/04* (2006.01)
*G02B 5/00* (2006.01)
(Continued)

(52) U.S. Cl.
CPC .......... *G01J 1/0448* (2013.01); *G01J 1/0437* (2013.01); *G02B 5/005* (2013.01); *G02B 26/023* (2013.01);
(Continued)

(58) Field of Classification Search
CPC ........ G03B 7/095; G03B 7/097; G02B 26/04; G02B 26/023; G01J 1/0437
(Continued)

(56) References Cited

U.S. PATENT DOCUMENTS 7,859,741 B2    12/2010 Chikazawa et al.
2004/0051820 A1*    3/2004 Yuan .................. G02F 1/0136
349/33

(Continued)

FOREIGN PATENT DOCUMENTS

JP    2002-214666 A    7/2002
JP    2007-233390 A    9/2007
(Continued)

OTHER PUBLICATIONS

Syms, et al., "Sliding-blade MEMS iris and variable optical attenuator", Journal of Micromechanics and Microengineering, Institute of Physics Publishing, 2004, 12 pgs. total.
(Continued)

*Primary Examiner* — Georgia Y Epps
*Assistant Examiner* — Don Williams
(74) *Attorney, Agent, or Firm* — Sughrue Mion, PLLC

(57) ABSTRACT

An aperture adjusting apparatus is provided. The aperture adjusting apparatus includes: a variable part of which an aperture size varies; an optical sensor configured to sense light incident to the variable device part and light output from the variable device part; an aperture calculator configured to calculate a size of an aperture formed in the variable part from light intensity sensed by the optical sensor; and a driving controller configured to control driving of the variable device part by receiving a calculation result fed back from the aperture calculator.

14 Claims, 8 Drawing Sheets

(51) Int. Cl.
*H04N 5/225* (2006.01)
*G02B 26/02* (2006.01)
*H04N 5/238* (2006.01)
*G03B 7/095* (2006.01)

(52) U.S. Cl.
CPC ........... *H04N 5/2254* (2013.01); *H04N 5/238* (2013.01); *G03B 7/095* (2013.01)

(58) Field of Classification Search
USPC .................................. 250/201.1, 201.2, 204
See application file for complete search history.

(56) References Cited

U.S. PATENT DOCUMENTS

| | | | |
|---|---|---|---|
| 2012/0026386 A1* | 2/2012 | Tomita | G02B 7/36 348/345 |
| 2013/0155396 A1* | 6/2013 | Deliwala | G01J 1/0242 356/138 |
| 2014/0192218 A1 | 7/2014 | Jung et al. | |
| 2014/0240586 A1 | 8/2014 | Lee et al. | |

FOREIGN PATENT DOCUMENTS

| | | |
|---|---|---|
| JP | 2008-76833 A | 4/2008 |
| JP | 2008-180834 A | 8/2008 |
| KR | 10-2013-0009504 A | 1/2013 |

OTHER PUBLICATIONS

Li, et al., "Mechanically tunable optofluidic distributed feedback dye laser", Optics Express, vol. 14, No. 22, Oct. 30, 2006, pp. 10494-10499.

Hongbin, et al., "Optofluidic variable aperture", Optics Letters, vol. 33, No. 6, Mar. 15, 2008, pp. 548-550.

Müller, et al., "An Optofluidic Concept for a Tunable Micro-iris", Journal of Microelectromechanical Systems, vol. 19, No. 6, Dec. 2010, pp. 1477-1484.

Tsai, et al., "Circular dielectric liquid iris", Optics Letters, vol. 35, No. 14, Jul. 15, 2010, pp. 2484-2486.

Barbulovic-Nad, et al., "A microfluidic platform for complete mammalian cell culture", Lab on a Chip, Micro- & nano-fluidic research for chemistry, physics, biology, & bioengineering, vol. 10, No. 12, Jun. 21, 2010, 8 pgs. total.

Heikenfeld, et al., "Electrofluidic displays using Young-Laplace transposition of brilliant pigment dispersions", Nature Photonics, vol. 3, May 2009, pp. 292-296.

"Liquid lenses make a splash", Out of the Lab, Nature Photonics, Sep. 2006, pp. 2-4.

Hayes, et al., "Video-speed electronic paper based on electrowetting", Nature, vol. 425, Sep. 25, 2003, pp. 383-385.

* cited by examiner

METHOD AND APPARATUS FOR ADJUSTING AN APERTURE IN AN OPTICAL SYSTEM

CROSS-REFERENCE TO RELATED APPLICATIONS

This application claims the benefit of Korean Patent Application No. 10-2013-0001785, filed on Jan. 7, 2013, in the Korean Intellectual Property Office, the disclosure of which is incorporated herein by reference in its entirety.

BACKGROUND

1. Field

The exemplary embodiments relate to methods and apparatuses for adjusting an aperture in an optical system.

2. Description of the Related Art

A technique of adjusting and controlling a transmissivity of light is widely used for an iris or shutter in image acquisition devices, or is used to drive individual pixels in image display devices.

A variable iris generally used in existing optical systems mainly utilizes a method of manipulating several metal blades, wherein a mechanical motion, a frictional force, and the use of a moving mechanical element limit miniaturization.

Recently, variable irises have been proposed using a microelectrofluidic method using an electrowetting technique. The electrowetting technique, which is a technique of controlling a contact angle of a polar liquid, has been largely used in various fields, such as lab-on-a-chip, a liquid lens, a display, and the like, with characteristics of a quick response speed and low power consumption.

A variable iris using a microelectrofluidic method includes an electrode, upper and lower channels through which a fluid flows, and polar and non-polar fluids disposed in the upper and lower channels. In response to a voltage being applied between an electrode coated with a dielectric and the polar-fluid, an electromechanical force works on a three-phase contact line (TCL) between a fluid interface and the electrode, and results in changing, a contact angle. Accordingly, a Laplace pressure difference in the upper and lower channels is caused to make the polar fluid in the lower channel flow inwards (towards a center) or outwards (towards a circumference), and thus, the size of the aperture can be varied.

Although the variable iris using a microelectrofluidic method has a high aperture ratio, a low driving voltage, and a quick opening/closing speed, accuracy is necessary. As a result, a driving force at a very precise level is applied to control an aperture size, and an initial droplet amount may be accurately controlled in order to accurately define an aperture location in an initial iris state, and the like.

SUMMARY

An aperture adjusting method and apparatus capable of minutely adjusting an aperture size are provided.

Additional aspects will be set forth in part in the description which follows and, in part, will be apparent from the description, or may be learned by practice of the exemplary embodiments.

According to an aspect of the exemplary embodiments, an aperture adjusting apparatus includes: a variable device having a variable aperture size; an optical sensor configured to sense light incident to the variable device and light output from the variable device; an aperture calculator configured to calculate calculating a size of an aperture formed in the variable device from light intensity sensed by the optical sensor; and a driving controller configured to control driving of the variable device by receiving a calculation result fed back from the aperture calculator.

The optical sensor may include a photoelectric sensor configured to output an electrical signal from input light.

The optical sensor may include: a first optical sensor having a strip shape, disposed on a light-incident surface of the variable device; and a second optical sensor having a strip shape, disposed on a light-output surface of the variable device.

The first and second optical sensors may be configured to respectively cross the centers of the light-incident surface and the light-output surface.

The aperture of the variable device may have a rotationally symmetric shape about a central axis thereof, and the first and second optical sensors may be disposed at locations that are rotationally symmetric to each other about the central axis.

The aperture size of the variable device may be adjusted according to an electromechanical method.

The aperture size of the variable device may be adjusted according to a microelectrofludic method, and in this case, the variable part may include: a chamber forming a space in which a fluid flows, the chamber having a lower channel and an upper channel connected to each other; a photo-interceptive first fluid and a photo-transmissive second fluid having a property that the second fluid does not mix with the first fluid, which are prepared in the chamber; and an electrode, which is prepared in the lower channel, and to which a voltage is applied in order to change an interface location between the first fluid and the second fluid.

A height of the lower channel may be at the lowest point at a center thereof and be gradually higher towards a circumference thereof.

The chamber may include: a first substrate; a second substrate which is separated from the first substrate and has a plurality of through holes formed at a center and near a circumference thereof; a third substrate separated from the second substrate; a first spacer surrounding a space between the first substrate and the second substrate and forming the lower channel; and a second spacer surrounding a space between the second substrate and the third substrate and forming the upper channel.

A surface of the first substrate which faces the lower channel, may be a curved surface which gradually protrudes towards a center of the first substrate, and a surface of the second substrate, which faces the lower channel, may be flat.

A surface of the first substrate which faces the lower channel, may be flat, and a surface of the second substrate which faces the lower channel, may be a curved surface which gradually protrudes towards a center of the second substrate.

A surface of the first substrate which faces the lower channel, may be a curved surface which gradually protrudes towards a center of the first substrate, and a surface of the second substrate, which faces the lower channel, may be a curved surface which gradually protrudes towards a center of the second substrate.

The aperture size of the variable part may be adjusted according to a hydraulic method. In this case, the variable part may include: a chamber forming a space in which a fluid flows, the chamber having a lower channel and an upper channel connected to each other; a photo-interceptive first fluid disposed in a circumferential region of the lower channel and a photo-transmissive second fluid having a property that the second fluid does not mix with the first fluid, which are prepared in the chamber; and a pressure applier configured to apply a pressure to a surface of the first fluid in order to move the first fluid towards a center of the lower channel.

A height of the lower channel may be lowest at a center thereof and may gradually become higher towards a circumference thereof.

The chamber may include: a first substrate; a second substrate which is separated from the first substrate and has a plurality of through holes formed at a center and near a circumference thereof; a third substrate separated from the second substrate; a first spacer surrounding a space between the first substrate and the second substrate and forming the lower channel; and a second spacer surrounding a space between the second substrate and the third substrate and forming the upper channel.

The pressure applier may be implemented as a polymer actuator configured to cover through holes formed near the circumference of the second substrate.

A surface of the first substrate which faces the lower channel, may be a curved surface which gradually protrudes towards a center of the first substrate, and a surface of the second substrate which faces the lower channel, may be flat.

A surface of the first substrate which faces the lower channel, may be flat, and a surface of the second substrate which faces the lower channel, may be a curved surface which gradually protrudes towards a center of the second substrate.

A surface of the first substrate, which faces the lower channel, may be a curved surface which gradually protrudes towards a center of the first substrate, and a surface of the second substrate which faces the lower channel, may be a curved surface which gradually protrudes towards a center of the second substrate.

The aperture size of the variable device may be adjusted according to a pneumatic method, and in this case, the variable device may include: a chamber forming a space in which a fluid flows, the chamber having a lower channel and an upper channel connected to each other; a photo-interceptive first fluid disposed in a circumferential region of the lower channel and a photo-transmissive second fluid having a property that the second fluid does not mix with the first fluid, which are prepared in the chamber; and a pressure applier configured to apply air pressure to the first fluid in order to move the first fluid towards a center of the lower channel.

A height of the lower channel may be lowest at a center thereof and may gradually be higher towards a circumference thereof.

The chamber may include: a first substrate; a second substrate which is separated from the first substrate and has a plurality of through holes formed at a center thereof; a third substrate separated from the second substrate; a first spacer surrounding a space between the first substrate and the second substrate and forming the lower channel; and a second spacer surrounding a space between the second substrate and the third substrate and forming the upper channel.

A surface of the first substrate, which faces the lower channel, may be a curved surface which gradually protrudes toward a center of the first substrate, and a surface of the second substrate which faces the lower channel, may be flat.

A surface of the first substrate which faces the lower channel, may be flat, and a surface of the second substrate which faces the lower channel, may be a curved surface which gradually protrudes toward a center of the second substrate.

A surface of the first substrate which faces the lower channel, may be a curved surface which gradually protrudes toward a center of the first substrate, and a surface of the second substrate which faces the lower channel, may be a curved surface which gradually protrudes towards a center of the second substrate.

According to another aspect of the exemplary embodiments, an aperture adjusting method includes: calculating a size of an aperture formed in a variable part by comparing the intensity of light incident on the variable device with the intensity of light output from the variable device; and adjusting a driving force of the variable device part by taking the calculated aperture size into account.

The calculating of the aperture size may include respectively mounting first and second optical sensors having a strip shape at a light-incident surface and a light-output surface of the variable part, and comparing signals sensed by the first and second optical sensors in order to calculate the aperture size.

An aspect of an exemplary embodiment may further provide an aperture adjusting apparatus including: a variable device configured to provide a variable aperture size; an aperture calculator configured to calculate a size of an aperture formed in the variable device from sensed light intensity; and a driving controller configured to drive the variable device upon receiving a calculation result fed back from the aperture calculator.

The aperture adjusting apparatus may further include an optical sensor configured to sense light incident to the variable device and light output from the variable device;

An exemplary embodiment may further include a variable device for adjusting an aperture, the variable device including: a chamber forming a space in which a fluid flows, the chamber configured to have a lower channel and an upper channel connected to each other; a photo-interceptive first fluid disposed in a circumferential region of the lower channel and a photo-transmissive second fluid having a property that the second fluid does not mix with the first fluid, which are prepared in the chamber; and a pressure applier configured to apply air pressure to the first fluid in order to move the first fluid towards a center of the lower channel.

The optical sensor may include a photoelectric sensor having: a first optical sensor having a strip shape, disposed on a light-incident surface of the variable device; and a second optical sensor having a strip shape, disposed on a light-output surface of the variable device.

The aperture of the variable device may have a rotationally symmetric shape about a central axis thereof, and the first and second optical sensors are disposed at locations that are rotationally symmetric to each other about the central axis.

The aperture size of the variable device may be adjusted according to an electromechanical method.

The aperture size of the variable device may be adjusted according to a microelectrofluidic method.

The variable device may further include a pressure applier configured to apply a pressure to a surface of the first fluid in order to move the first fluid towards a center of the lower channel.

A height of the lower channel is lowest at a center thereof and gradually becomes higher towards a circumference thereof.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
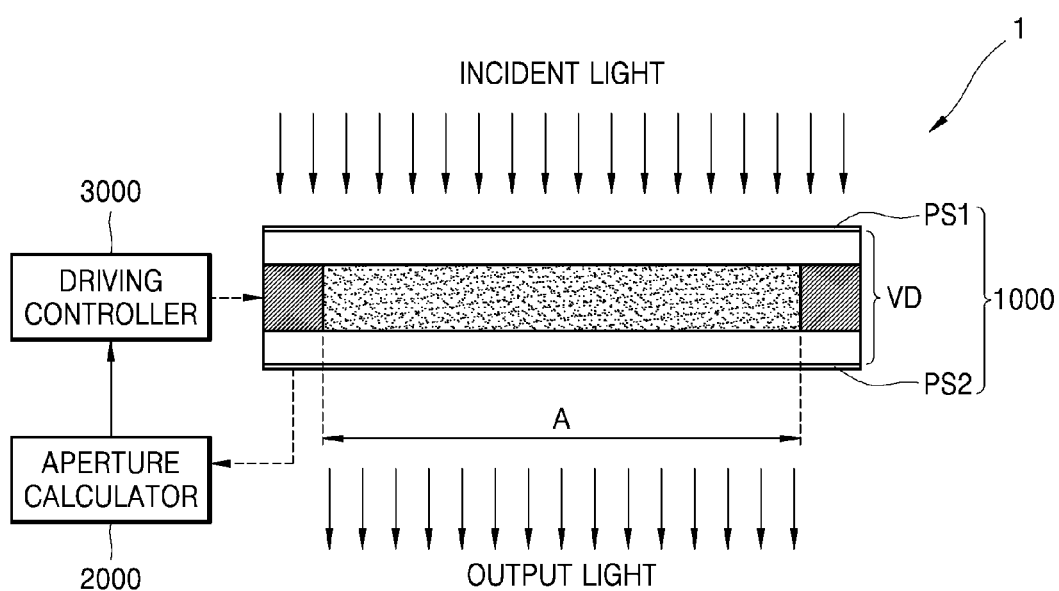
FIG. 1 is a block diagram showing a schematic structure of an aperture adjusting apparatus according to an exemplary embodiment.

Reference will now be made in detail to the exemplary embodiments, examples of which are illustrated in the accompanying drawings, wherein like reference numerals refer to like elements throughout. Widths and thicknesses of layers and regions shown in the accompanying drawings may be somewhat exaggerated for clarity of the specification. In this regard, the exemplary embodiments may have different forms and should not be construed as being limited to the descriptions set forth herein. Accordingly, the embodiments are merely described below, by referring to the figures, to explain aspects of the present description.

FIG. 1 is a block diagram showing a schematic structure of an aperture adjusting apparatus 1 according to an exemplary embodiment.

The aperture adjusting apparatus 1 may include a variable iris 1000 having a variable device VD of which a size of an aperture A varies and an optical sensor which senses light incident to the variable device part VD and light output from the variable part VD, an aperture calculator 2000 which calculates the aperture size formed in the variable part VD from light intensity sensed by the optical sensor, and a driving controller 3000 which controls driving of the variable device part VD by receiving a calculation result fed back from the aperture calculator 2000.

The optical sensor may include a photoelectric sensor which outputs an electrical signal from input light, and as shown in FIG. 1, the optical sensor may include a strip-shaped first optical sensor PS1 disposed on a light-incident surface of the variable part VD and a strip-shaped second optical sensor PS2 disposed on a light-output surface of the variable device VD.

The first optical sensor PS1 and the second optical sensor PS2 may be implemented in a form which respectively crosses the centers of the light-incident surface and the light-output surface of the variable device part VD. Although FIG. 1 shows the first optical sensor PS1 and the second optical sensor PS2 disposed to face each other, the exemplary embodiments are not limited thereto. For example, the aperture A of the variable device VD may have a cross-sectional shape that is rotationally symmetric about a central axis, and in this case, the first optical sensor PS1 and the second optical sensor PS2 may be disposed at locations that are rotationally symmetric about the central axis.

The variable device VD forms the aperture A by driving of any of various methods, e.g., an electromechanical method, a microelectrofluidic method, a hydraulic method and a pneumatic method.

The driving controller 3000 is configured to provide a driving force suitable to form an aperture having a desired size in the variable device VD.

The aperture calculator 2000 calculates a size of the aperture A through sensing light intensities by using the first optical sensor PS1 and the second optical sensor PS2, respectively formed at the light-incident surface and the light-output surface of the variable device part VD and comparing the sensed light intensities and feeds the calculation result back to the driving controller 3000 in order to correct or adjust the aperture size.

Variable irises employable in the aperture adjusting apparatus 1000 of FIG. 1 according to various embodiments of the exemplary embodiments will now be described.

Figure 2:
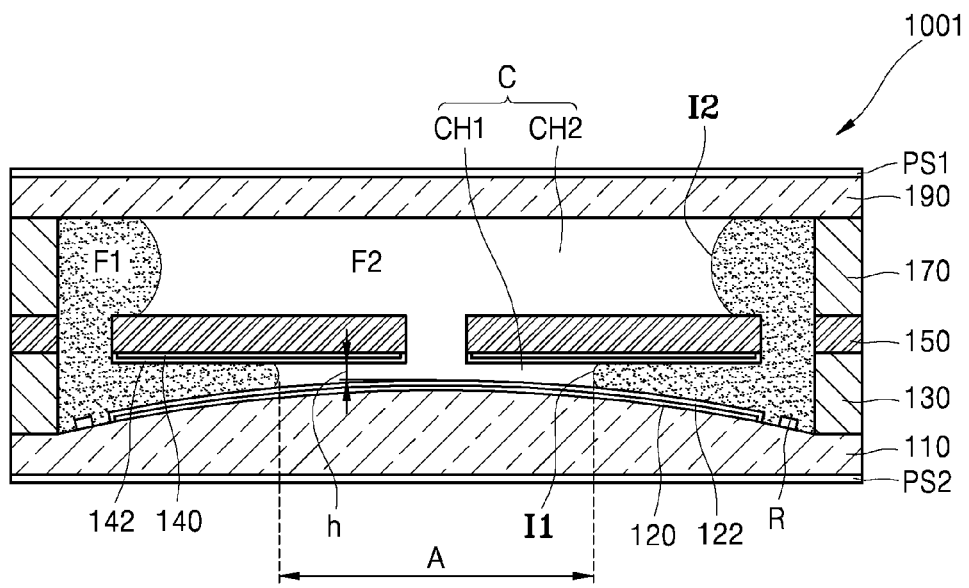
FIG. 2 is a cross-sectional view showing a schematic structure of a variable iris employable in the aperture adjusting apparatus of FIG. 1, according to an exemplary embodiment.

FIG. 2 is a cross-sectional view showing a schematic structure of a variable iris 1001 according to an exemplary embodiment.

The variable iris 1001 has a structure which adjusts the aperture A according to a microelectrofluidic method. To this end, the variable iris 1001 includes a chamber C forming a space in which a fluid flows, and having a lower channel CH1 and an upper channel CH2 connected to each other, a photo-interceptive first fluid F1 and a photo-transmissive second fluid F2 having a property that the second fluid F2 does not mix with the first fluid F1, which are prepared in the chamber C, and an electrode, which is prepared in the lower channel CH1, and to which a voltage is applied to change an interface location between the first fluid F1 and the second fluid F2.

The first fluid F1 may be a polar fluid, and the second fluid F2 may be a non-polar fluid.

As shown in FIG. 2, the chamber C includes a first substrate 110, a second substrate 150, which is separated from the first substrate 110 and has a plurality of through holes formed at a center and near a circumference thereof, a third substrate 190 separated from the second substrate 150, a first spacer 130 which surrounds a space between the first substrate 110 and the second substrate 150 and forming the lower channel CH1, and a second spacer 170 which surrounds a space between the second substrate 150 and the third substrate 190 and forming the upper channel CH2.

The electrode includes a first electrode unit 120 formed on an upper surface of the first substrate 110 and coated with an insulation material layer 122, and a second electrode 140 formed on a lower surface of the second substrate 150 and coated with an insulation material layer 142. The insulation material layers 122 and 142 may be hydrophobic-surface-treated. In addition, a ground electrode R may be formed on the upper surface of the first substrate 110. A location of the ground electrode R is not limited to the location shown and may be changed to another location contacting the polar first fluid F1. In addition, only one of the first electrode 120 and the second electrode 140 may be included.

The first optical sensor PS1 and the second optical sensor PS2 may be respectively disposed at locations of the light-incident surface and the light-output surface. As shown in FIG. 1, the first optical sensor PS1 and the second optical sensor PS2 may be respectively disposed on an upper surface of the third substrate 190 and a lower surface of the first substrate 110.

The lower channel CH1 forms a non-parallel plate channel of which a height h is non-uniform. The height h of the lower channel CH1 may be formed in a shape where the height h is lowest at a center thereof and is gradually higher towards a circumference thereof. To this end, a surface of the first substrate 110 which faces the lower channel CH1, may be a curved surface which gradually protrudes towards a center of the first substrate 110. A surface of the second substrate 150 which faces the lower channel CH1, may be flat.

Forming the height h of the lower channel CH1 as described above enables the aperture A to maintain a circular shape when the aperture size is adjusted by adjusting locations of fluid interfaces I1 and I2 by electrowetting driving. In response to a voltage being applied to the first and second electrodes 120 and 140, a contact angle of the interface I1 between the first fluid F1 and the second fluid F2 on surfaces of the insulation material layers 122 and 142 in the lower channel CH1 is changed, and accordingly, the interfaces I1 and I2 move to achieve a Laplace pressure equilibrium at the interface I1 formed in the lower channel CH1 and the interface I2 formed in the upper channel CH2, thereby changing a size of the aperture A.

In this case, in response to the Laplace pressure equilibrium being achieved at a predetermined voltage applied to the first fluid F1, contact angles of the two interfaces I1 and I2 are constant, and thus, radiuses of curvature of the two interfaces I1 and I2 are determined by the height h of the lower channel CH1 at corresponding locations. Thus, when the height h of the lower channel CH1 is formed to be non-uniform in a shape where the height h is gradually higher towards both sides from a center thereof, the second fluid F2 may be formed in a concentric annulus shape connected at points having the same Laplace pressure about the center of the variable iris 1001. That is, the second fluid F2 may be expanded or contracted while maintaining the concentric annulus shape according to a magnitude of an applied voltage. In response to a channel height varying according to locations of the two interfaces I1 and I2, a Laplace pressure difference occurs on a location basis and works as a driving force to find an equilibrium point. Thus, the aperture A may form a circular shape based on a central axis. In addition, as a height variation of the lower channel CH1 increases towards a circumference from the center of the variable iris 1001, a shape of the aperture A may be effectively controlled.

Unlike the structure of this exemplary embodiment, in response to the height h of the lower channel CH1 being constant, a contact angle of the first fluid F1 in the lower channel CH1 is constant regardless of locations of the two interfaces I1 and I2. Thus, since a plurality of points at which a Laplace pressure is balanced may exist, a shape of the aperture A may not be circular, and accuracy of adjustment of the aperture A may be lowered.

Since the variable iris 1001 forms a non-parallel plate channel of which a channel height is non-uniform, a circular shape of the aperture A is well controlled. In addition, the aperture A is controlled by calculating a formed aperture size from the intensities sensed by the first optical sensor PS1 and the second optical sensor PS2 and feeding the calculation result back to the driving controller 3000 in order to adjust a voltage applied to the first and second electrodes 120 and 140.

Figure 3:
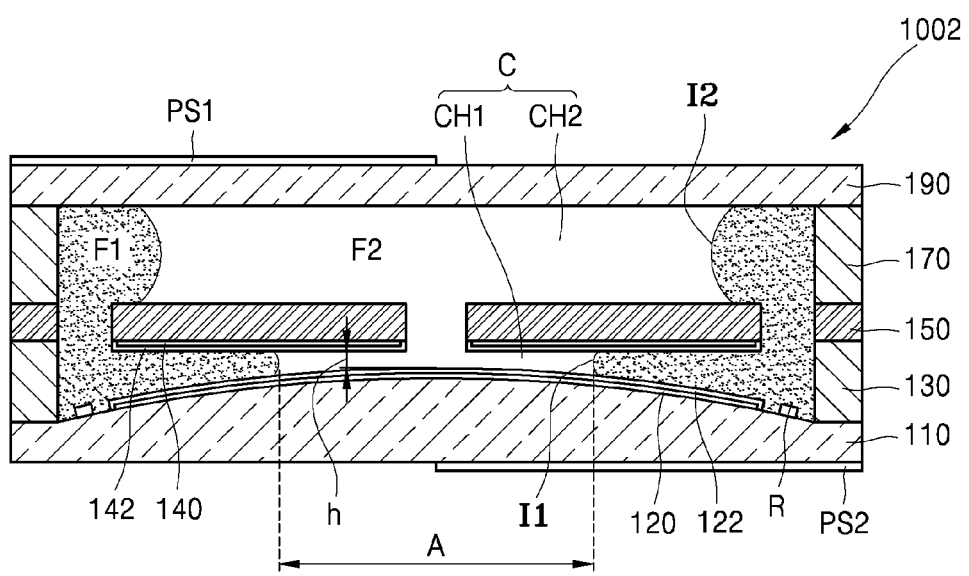
FIG. 3 is a cross-sectional view showing a schematic structure of a variable iris according to another exemplary embodiment.

FIG. 3 is a cross-sectional view showing a schematic structure of a variable iris 1002 according to another exemplary embodiment.

The variable iris 1002 of the current embodiment differs from the variable iris 1001 of FIG. 2 with respect to an arrangement form of the first optical sensor PS1 and the second optical sensor PS2. The first optical sensor PS1 and the second optical sensor PS2 are not disposed at locations facing each other. That is, since the variable iris 1002 has a rotationally symmetric shape based on a central axis, the first optical sensor PS1 and the second optical sensor PS2 may be disposed at locations which maintain the rotational symmetry therebetween.

Figure 4:
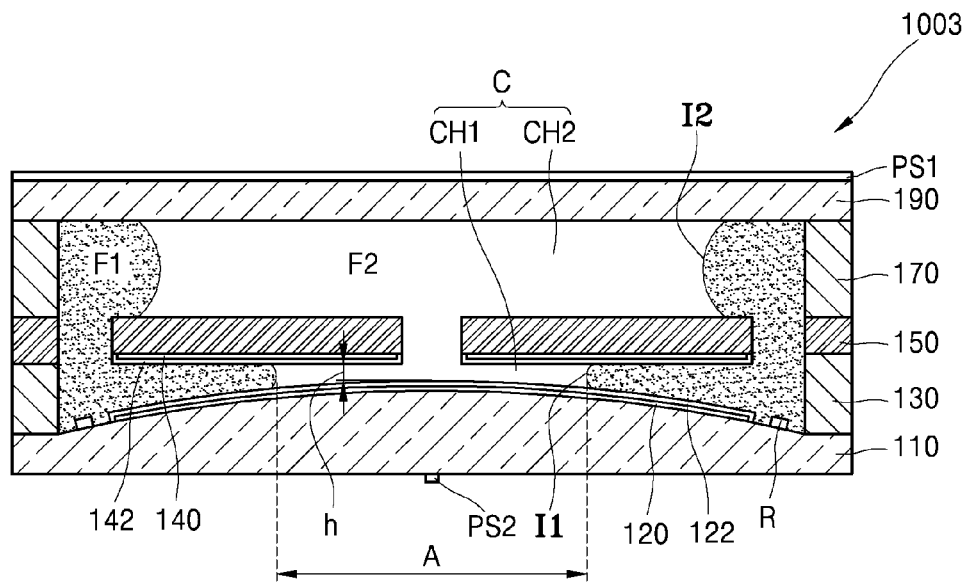
FIG. 4 is a cross-sectional view showing a schematic structure of a variable iris according to another exemplary embodiment.

FIG. 4 is a cross-sectional view showing a schematic structure of a variable iris 1003 according to another exemplary embodiment.

In the variable iris 1003 of the exemplary embodiment, the first optical sensor PS1 and the second optical sensor PS2 are disposed at locations facing each other by a rotational symmetry of 90°.

Figure 5:
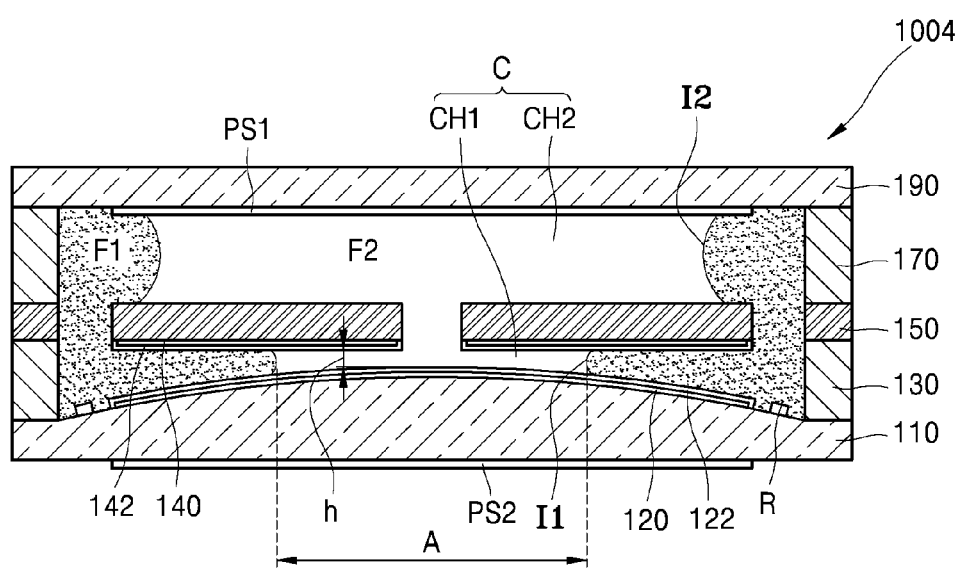
FIG. 5 is a cross-sectional view showing a schematic structure of a variable iris according to another exemplary embodiment.

FIG. 5 is a cross-sectional view showing a schematic structure of a variable iris 1004 according to another exemplary embodiment.

In the variable iris 1004 of the exemplary embodiment, the first optical sensor PS1 is disposed on the lower surface of the third substrate 190.

The first optical sensor PS1 and the second optical sensor PS2 may be formed at various locations at which the intensity of light incident to a variable iris is comparable with the intensity of light output from the variable iris, in addition to the locations described above.

Figure 6:
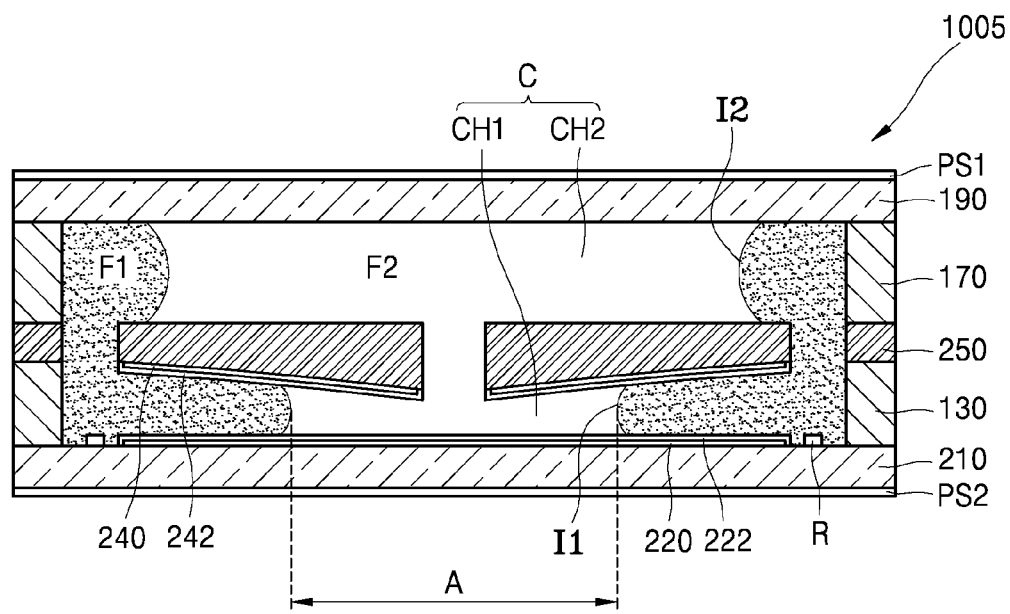
FIG. 6 is a cross-sectional view showing a schematic structure of a variable iris according to another exemplary embodiment.

FIG. 6 is a cross-sectional view showing a schematic structure of a variable iris 1005 according to another exemplary embodiment.

The variable iris 1005 of this exemplary embodiment uses a method of adjusting an aperture A in a microelectrofluidic method and differs from the exemplary embodiments described above with respect to a shape of the lower channel CH1.

The lower channel CH1 has a shape having a height that is lowest at a center thereof and that gradually increases towards a circumference thereof. To this end, a surface of a first substrate 210 which faces the lower channel CH1, is flat, and a surface of a second substrate 250 which faces the lower channel CH1, is a curved surface which gradually protrudes towards a center of the second substrate 250.

Figure 7:
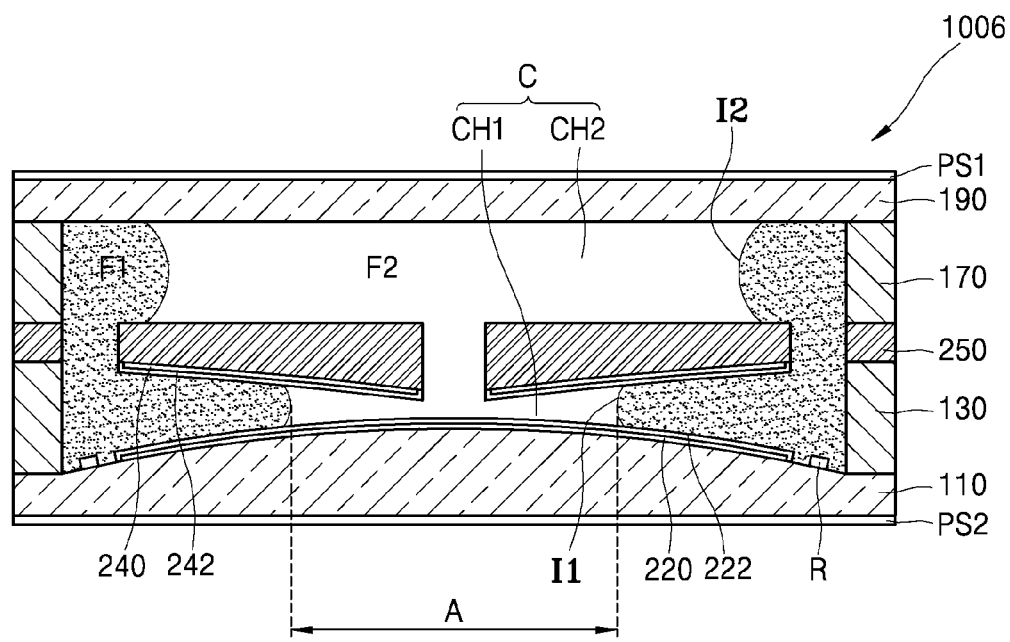
FIG. 7 is a cross-sectional view showing a schematic structure of a variable iris according to another exemplary embodiment.

FIG. 7 is a cross-sectional view showing a schematic structure of a variable iris 1006 according to another exemplary embodiment.

The variable iris 1006 of this exemplary embodiment differs from the exemplary embodiment of FIG. 6 with respect to a shape of the lower channel CH1. That is, both a surface of the first substrate 110, which faces the lower channel CH1, and a surface of the second substrate 250, which faces the lower channel CH1, is curved surfaces which gradually protrude towards a center thereof.

Although it is shown in both the variable irises 1005 and 1006 of FIGS. 6 and 7 that the first optical sensor PS1 and the second optical sensor PS2 are respectively disposed on the upper surface of the third substrate 190 and the lower surface of the first substrate 210 or 110 to face each other, they are only illustrative and may be modified according to the arrangements shown in FIGS. 3 to 5.

Figure 8A:
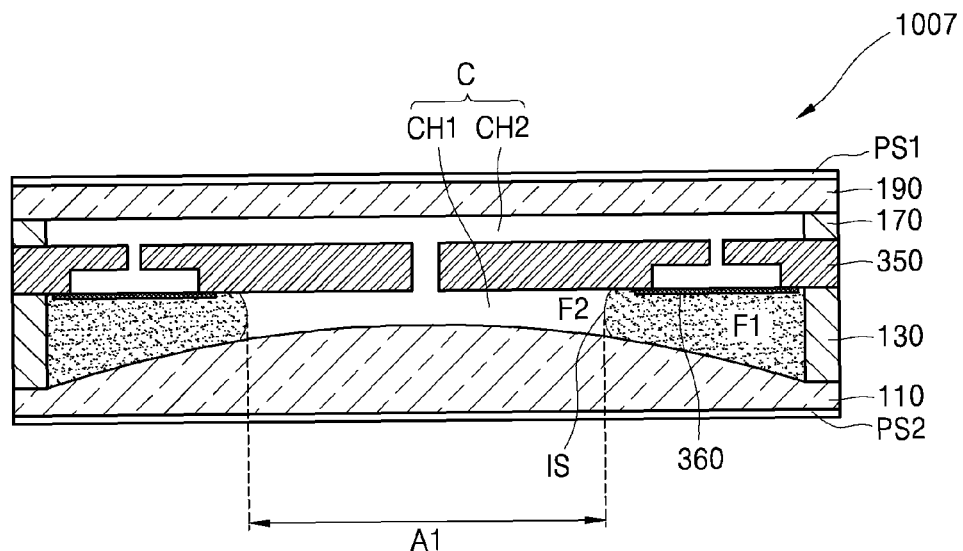
FIGS. 8A and 8B are cross-sectional views showing a schematic structure of a variable iris according to another exemplary embodiment, wherein different sizes of apertures are formed.
Figure 8B:
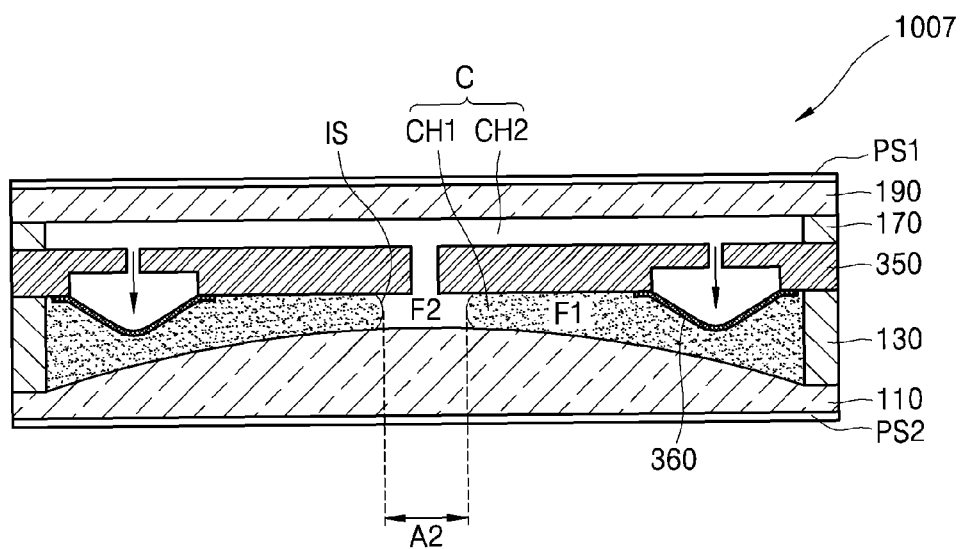

FIGS. 8A and 8B are cross-sectional views showing a schematic structure of a variable iris 1007 according to another exemplary embodiment, wherein apertures A1 and A2 with different sizes are formed.

The variable iris 1007 of this exemplary embodiment has a structure in which an aperture size is adjusted according to a hydraulic method. The variable iris 1007 includes a chamber C forming a space in which a fluid flows and has a lower channel CH1 and an upper channel CH2 connected to each other, a photo-interceptive first fluid F1 disposed in a circumference region of the lower channel CH1 and a photo-transmissive second fluid F2 having a property that the second fluid F2 does not mix with the first fluid F1, which are prepared in the chamber C, and a pressure applier configured to apply a pressure to a surface of the first fluid F1 in order to move the first fluid F1 towards a center of the lower channel CH1.

The chamber C includes a first substrate 110, a second substrate 350 which is separated from the first substrate 110 and has a plurality of through holes formed at a center and near a circumference thereof, a third substrate 190 separated from the second substrate 350, a first spacer 130 surrounding a space between the first substrate 110 and the second substrate 350 and forming the lower channel CH1, and a second spacer 170 surrounding a space between the second substrate 350 and the third substrate 190 and forming the upper channel CH2.

A first optical sensor PS1 and a second optical sensor PS2 are respectively disposed on the upper surface of the third substrate 190 and the lower surface of the first substrate 110.

The shape of the lower channel CH1 may be a shape with a height that is lowest at a center thereof and that is gradually higher towards a circumference thereof. To this end, a surface of the first substrate 110, which faces the lower channel CH1, may be a curved surface which gradually protrudes towards a center of the first substrate 110, and a surface of the second substrate 350, which faces the lower channel CH1, may be flat.

The pressure applying means may be a polymer actuator 360 which is disposed in a form covering through holes formed near a circumference of the second substrate 350.

According to whether a pressure is applied to the first fluid F1 by the polymer actuator 360, a location of an interface IS between the first fluid F1 and the second fluid F2 is changed, thereby adjusting an aperture size. As shown in FIG. 8B, in response to a pressure being applied to the first fluid F1 by driving the polymer actuator 360, the first fluid F1 moves from the circumference region to the central region, and accordingly, a location of the interface IS is changed, thereby adjusting an aperture size.

Figure 9:
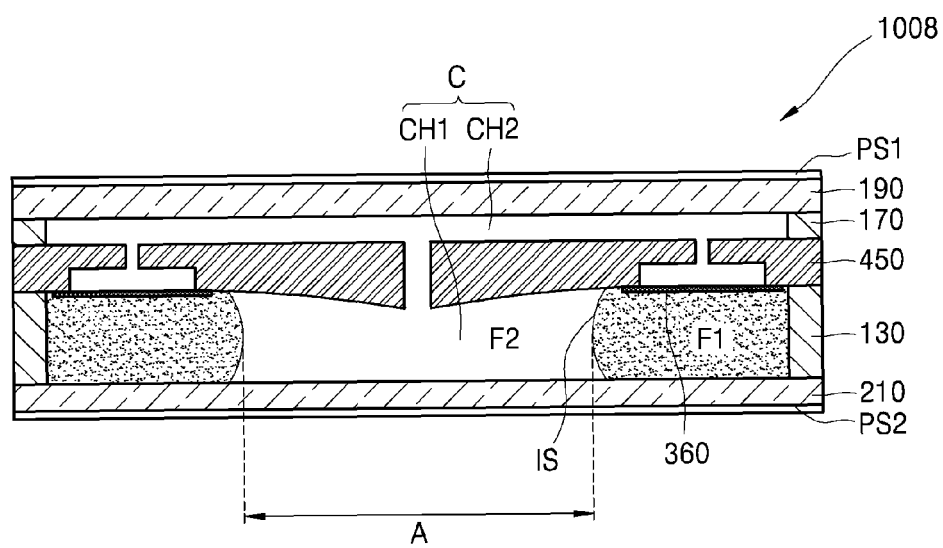
FIG. 9 is a cross-sectional view showing a schematic structure of a variable iris according to another exemplary embodiment.

FIG. 9 is a cross-sectional view showing a schematic structure of a variable iris 1008 according to another exemplary embodiment.

The variable iris 1008 of the current embodiment differs from the variable iris 1007 of FIGS. 8A and 8B only in a shape of the lower channel CH1. That is, a surface of a first substrate 210 which faces the lower channel CH1, is flat, and a surface of a second substrate 450, which faces the lower channel CH1, is a curved surface which gradually protrudes towards a center of the second substrate 450.

Figure 10:
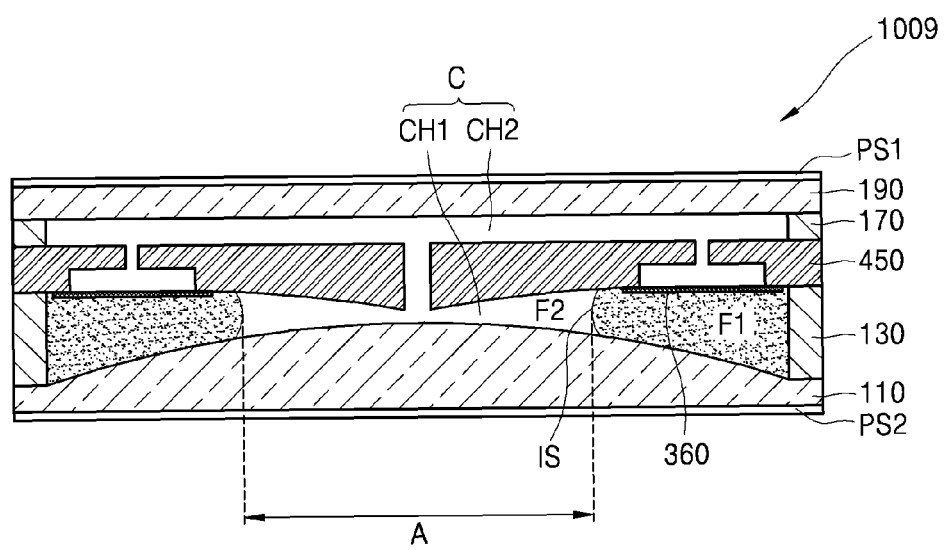
FIG. 10 is a cross-sectional view showing a schematic structure of a variable iris according to another exemplary embodiment.

FIG. 10 is a cross-sectional view showing a schematic structure of a variable iris 1009 according to another exemplary embodiment.

The variable iris 1009 of this exemplary embodiment differs from the variable iris 1008 of FIG. 9 only with respect to a shape of the lower channel CH1. That is, both a surface of the first substrate 110, which faces the lower channel CH1, and a surface of the second substrate 450, which faces the lower channel CH1, is a curved surfaces which gradually protrudes towards a center thereof.

Although it is shown in the variable irises 1007, 1008, and 1009 of FIGS. 8A, 8B, 9, and 10 that the first optical sensor PS1 and the second optical sensor PS2 are respectively disposed on the upper surface of the third substrate 190 and the lower surface of the first substrate 210 or 110 to face each other, they are only illustrative and may be modified according to the arrangements shown in FIGS. 3 to 5.

Figure 11A:
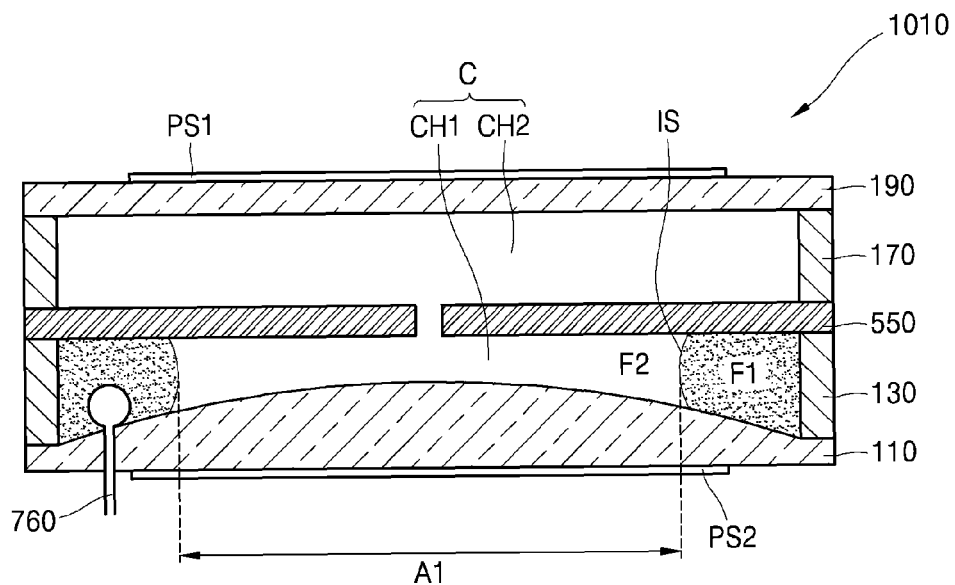
FIGS. 11A and 11B are cross-sectional views showing a schematic structure of a variable iris according to another exemplary embodiment, wherein different sizes of apertures are formed.
Figure 11B:
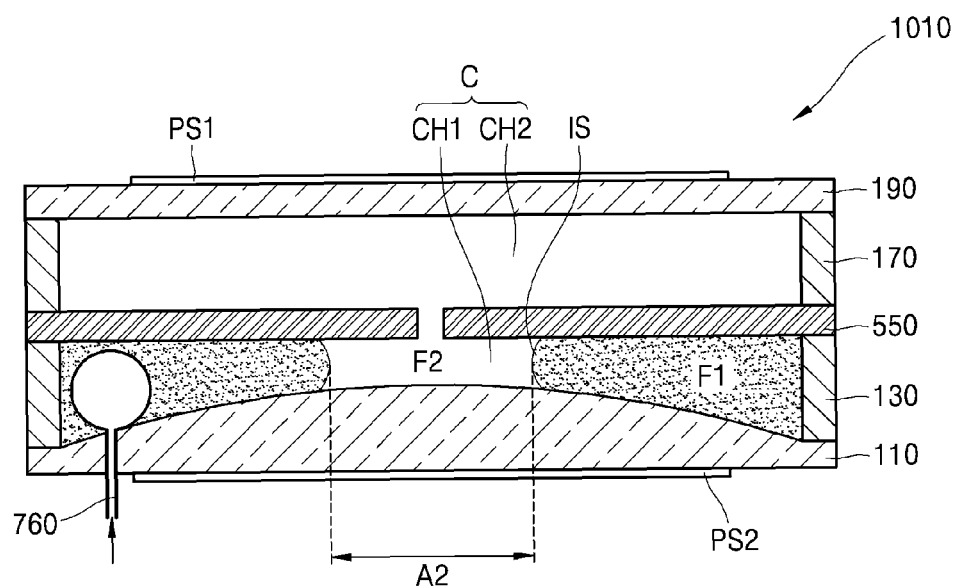

FIGS. 11A and 11B are cross-sectional views which show a schematic structure of a variable iris 1010 according to another exemplary embodiment, wherein different sizes of apertures A1 and A2 are formed.

The variable iris 1010 of this exemplary embodiment has a structure in which an aperture size is adjusted according to a pneumatic method.

The variable iris 1010 includes a chamber C forming a space in which a fluid flows and having a lower channel CH1 and an upper channel CH2 connected to each, a photo-interceptive first fluid F1 disposed in a circumferential region of the lower channel CH1 and a photo-transmissive second fluid F2 having a property that the second fluid F2 does not mix with the first fluid F1, which are prepared in the chamber C, and a pressure applier 760 configured to an air pressure to the first fluid F1 to move the first fluid F1 towards a central region of the lower channel CH1.

The chamber C includes a first substrate 110, a second substrate 550, which is separated from the first substrate 110 and has a plurality of through holes formed at a center thereof, a third substrate 190 separated from the second substrate 550, a first spacer 130 surrounding a space between the first substrate 110 and the second substrate 550 and forming the lower channel CH1, and a second spacer 170 surrounding a space between the second substrate 550 and the third substrate 190 and forming the upper channel CH2.

A height of the lower channel CH1 may be lowest at a center thereof and may gradually become higher towards a circumference thereof. A surface of the first substrate 110, which faces the lower channel CH1, may be a curved surface which gradually protrudes towards a center of the first substrate 110, and a surface of the second substrate 550 which faces the lower channel CH1, may be flat.

The pressure applier 760 which is configured to apply a pressure to the first fluid F1, may be a balloon as shown in FIGS. 11A and 11B and may apply a pressure to the first fluid F1 by injecting air into the balloon. According to a pressure applied to the first fluid F1, the first fluid F1 moves from the circumference region to the central region, and accordingly, a location of an interface IS of the first fluid F1 may be changed, for example, from a shape of FIG. 11A to a shape of FIG. 11B, thereby adjusting the size of the aperture.

Figure 12:
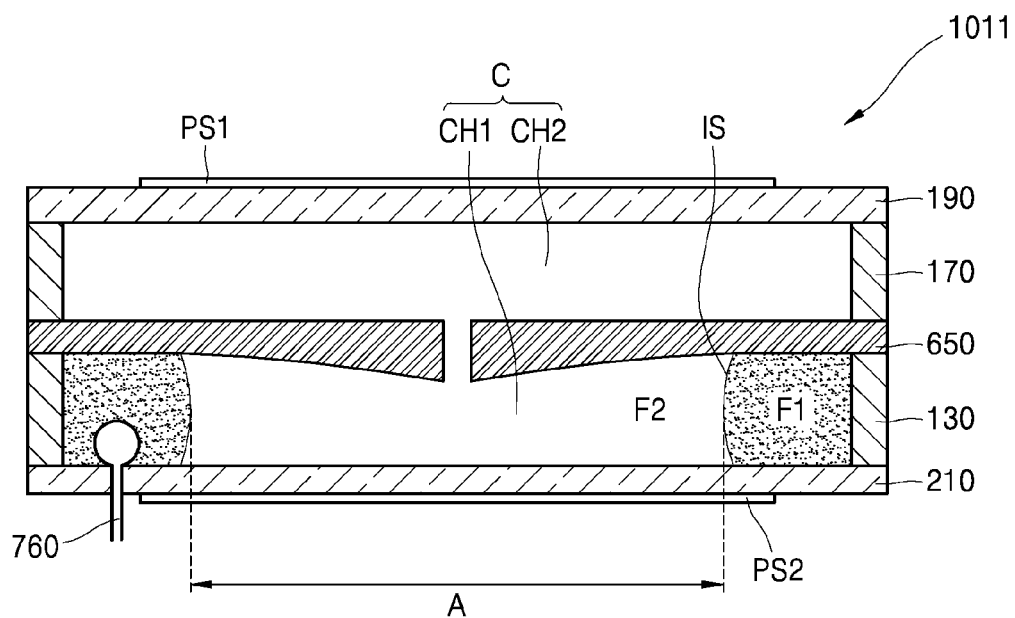
FIG. 12 is a cross-sectional view showing a schematic structure of a variable iris according to another exemplary embodiment.

FIG. 12 is a cross-sectional view which shows a schematic structure of a variable iris 1011, according to another exemplary embodiment.

The variable iris 1011 of this exemplary embodiment differs from the variable iris 1010 of FIGS. 11A and 11B only with respect to a shape of the lower channel CH1. That is, a surface of a first substrate 210, which faces the lower channel CH1, is flat, and a surface of a second substrate 650, which faces the lower channel CH1, is a curved surface which gradually protrudes towards a center of the second substrate 650.

Figure 13:
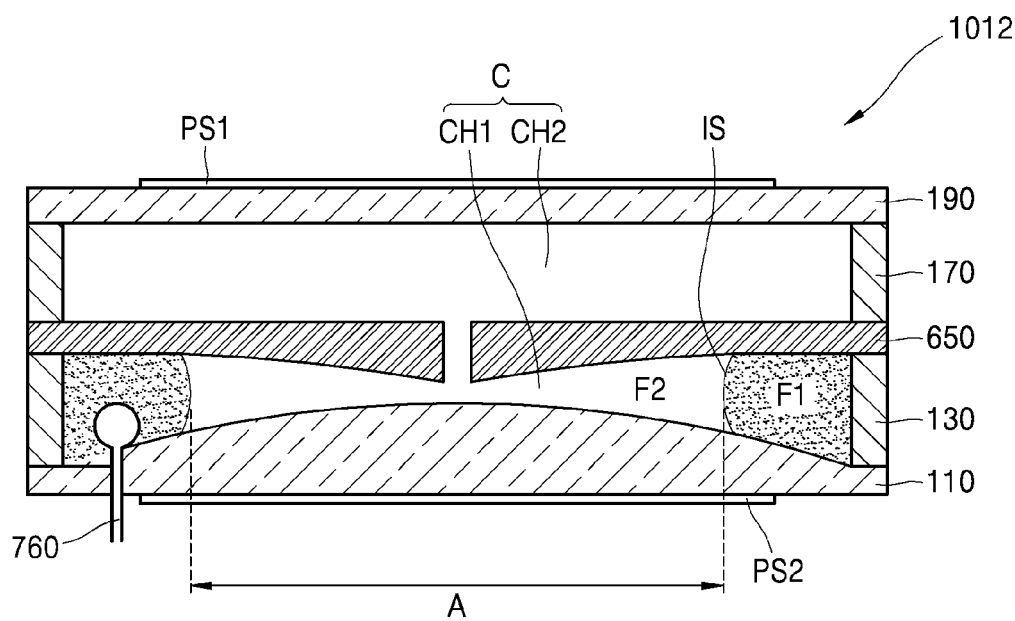
FIG. 13 is a cross-sectional view showing a schematic structure of a variable iris according to another exemplary embodiment.

FIG. 13 is a cross-sectional view which shows a schematic structure of a variable iris 1012 according to another exemplary embodiment.

The variable iris 1012 of this exemplary embodiment differs from the variable iris 1011 of FIG. 12 only with respect to a shape of the lower channel CH1. That is, both a surface of the first substrate 110 which faces the lower channel CH1, and a surface of the second substrate 650 which faces the lower channel CH1, is curved surfaces which gradually protrude towards a center thereof.

Although in the variable irises 1010, 1011, and 1012 of FIGS. 11A, 11B, 12, and 13 show that the first optical sensor PS1 and the second optical sensor PS2 are respectively disposed on the upper surface of the third substrate 190 and the lower surface of the first substrate 210 or 110 to face each other, this is only illustrative and may be modified according to the arrangements shown in FIGS. 3 to 5.

As described above, according to the one or more of the above exemplary embodiments, an aperture adjusting apparatus includes a pair of optical sensors at the front and the rear on an optical path of a variable iris and may compare light intensities sensed by the pair of optical sensors in order to control and correct an aperture size of the variable iris.

Accordingly, in response to a variable iris being formed, a burden to implement structural accuracy, e.g., a burden of adjusting a droplet amount at a high precision in response to the variable iris being formed in a microelectrofluidic method, is reduced, and a simple-shaped electrode structure may be employed.

In addition, in an environment using the variable iris, a transition according to an environmental element, such as heat, humidity, a continuous drive time, or the like, may be compensated for.

While an aperture adjusting apparatus and a method have been described with reference to the embodiments shown in the drawings to help the understanding, they are only illustrative, and it will be understood by one of ordinary skill in the art that various modifications and other equivalent embodiments may be derived from the illustrations. Therefore, the scope for which protection is sought should be defined by the appended claims.

What is claimed is:

1. An aperture adjusting apparatus comprising:
    a variable device configured to provide an aperture having a variable size;
    an optical sensor configured to sense a first light intensity of light incident to the variable device, and sense a second light intensity of light output from the variable device;
    an aperture calculator configured to calculate the variable size of the aperture based on the sensed first light intensity and the sensed second light intensity; and
    a driving controller configured to control driving of the variable device based on the calculated variable size of the aperture,
    wherein the driving controller is further configured to adjust the variable size of the aperture according to a microelectrofluidic method, and
    the variable device comprises:
        a chamber forming a space in which a fluid flows, the chamber having a lower channel and an upper channel connected to the lower channel;
        a photo-interceptive first fluid and a photo-transmissive second fluid having a property that the second fluid does not mix with the first fluid, the first fluid and the second fluid being disposed in the chamber: and
        an electrode disposed in the lower channel, to which a voltage is applied to change a location of an interface between the first fluid and the second fluid.

2. The aperture adjusting apparatus of claim 1, wherein the optical sensor comprises a photoelectric sensor configured to output an electrical signal from input light.

3. The aperture adjusting apparatus of claim 1, wherein the optical sensor comprises:
    a first optical sensor having a strip shape, disposed on a surface of the variable device to which the light incident to the variable device is incident, and configured to sense the first light intensity; and
    a second optical sensor having a strip shape, disposed on a surface of the variable device from which the light output from the variable device is output, and configured to sense the second light intensity.

4. The aperture adjusting apparatus of claim 3, wherein the first optical sensor and the second optical sensor are respectively disposed to cross centers of the light-incident surface and the light-output surface.

5. The aperture adjusting apparatus of claim 3, wherein the aperture of the variable device has a rotationally symmetric shape about a central axis of the variable device, and
    the first optical sensor and the second optical sensor are disposed at respective locations that are rotationally symmetric about the central axis.

6. The aperture adjusting apparatus of claim 1, wherein the driving controller is further configured to adjust the variable size of the aperture according to an electromechanical method.

7. The aperture adjusting apparatus of claim 1, wherein a height of the lower channel is lowest at a center of the lower channel and is gradually higher towards a circumference of the lower channel.

8. The aperture adjusting apparatus of claim 1, wherein the chamber comprises:
    a first substrate;
    a second substrate separated from the first substrate, and comprising a plurality of through holes disposed at a center and near a circumference of the second substrate;
    a third substrate separated from the second substrate;
    a first spacer surrounding a space between the first substrate and the second substrate, and forming the lower channel; and
    a second spacer surrounding a space between the second substrate and the third substrate, and forming the upper channel.

9. An aperture adjusting apparatus comprising:
    a variable device configured to provide an aperture having a variable size:

an optical sensor configured to sense a first light intensity of light incident to the variable device, and sense a second light intensity of light incident to the variable device;

an aperture calculator configured to calculate the variable le size of the aperture based on the sensed first light intensity and the sensed second light intensity; and a driving controller configured to control driving of the variable device based on the calculated variable size of the aperture, wherein the driving controller is further configured to adjust the variable size of the aperture according to a hydraulic method, and the variable device comprises:
- a chamber forming a space in which a fluid flows, the chamber having a lower channel and an upper channel connected to the lower channel;
- a photo-interceptive first fluid disposed in a circumferential part of the lower channel and a photo-transmissive second fluid having a property that the second fluid does not mix with the first fluid, the first fluid and the second fluid being disposed in the chamber; and
- a pressure applier configured to apply a pressure to a surface of the first fluid to move the first fluid towards a center of the lower channel.

10. The aperture adjusting apparatus of claim 9, wherein a height of the lower channel is lowest at a center of the lower channel and is gradually higher towards a circumference of the lower channel.

11. The aperture adjusting apparatus of claim 9, wherein the chamber comprises:
- a first substrate;
- a second substrate separated from the first substrate, and comprising plurality of through holes disposed at a center and near a circumference of the second substrate;
- a third substrate separated from the second substrate;
- a first spacer surrounding a space between the first substrate and the second substrate, and forming the lower channel; and
- a second spacer surrounding a space between the second substrate and the third substrate, and forming the upper channel.

12. The aperture adjusting apparatus of claim 9, wherein the pressure applier is a polymer actuator covering the plurality of through holes disposed near the circumference of the second substrate.

13. An aperture adjusting apparatus comprising:
a variable device configured to provide an aperture having a variable size;

an optical sensor configured to sense a first light intensity of light incident to the variable device, and sense a second light intensity of light output from the variable device, an aperture calculator configured to calculate the variable size of the aperture based on the sensed first light intensity and the sensed second light intensity; and a driving controller configured to control driving of the variable device based on the calculated variable size of the aperture, wherein the driving controller is further configured to adjust the variable size of the aperture according to a pneumatic method, and the variable device comprises:
- a chamber forming a space in which a fluid flows, the chamber having a lower channel and an upper channel connected to the lower channel;
- a photo-interceptive first fluid disposed in a circumferential region of the lower channel and a photo-transmissive second fluid having a property that the second fluid does not mix with the first fluid, the first fluid and the second fluid being disposed in the chamber; and
- a pressure applier configured to apply an air pressure to the first fluid to move the first fluid towards a center of the lower channel.

14. The aperture adjusting apparatus of claim 13, wherein a height of the lower channel is lowest at a center of the lower channel and is gradually higher towards a circumference of the lower channel.

* * * * *